United States Patent [19]
Hocker et al.

[11] Patent Number: 5,923,757
[45] Date of Patent: Jul. 13, 1999

[54] DOCKING METHOD FOR ESTABLISHING SECURE WIRELESS CONNECTION BETWEEN COMPUTER DEVICES USING A DOCKET PORT

[75] Inventors: Michael D. Hocker, Staatsburg, N.Y.; Brent J. Bahnub, Westlake, Ohio

[73] Assignee: International Business Machines Corporation, Armonk, N.Y.

[21] Appl. No.: 08/843,666

[22] Filed: Apr. 10, 1997

Related U.S. Application Data

[63] Continuation-in-part of application No. 08/296,219, Aug. 25, 1994.

[51] Int. Cl.$^6$ .............................. H04L 9/00; H04K 1/00
[52] U.S. Cl. .................... 380/21; 380/25; 395/186; 395/750; 341/22; 364/707; 364/140.01; 364/708; 361/686; 455/5.1; 345/158
[58] Field of Search ................... 379/67.1–80.28, 379/90.01–108.02, 350–386; 340/286.01–333; 364/130–194, 424.04, 707, 140.01, 708; 455/4.1–5.1, 403–466, 500, 524–525, 73; 345/158; 361/686; 395/186, 750

[56] References Cited

U.S. PATENT DOCUMENTS

| | | |
|---|---|---|
| 4,654,818 | 3/1987 | Wetteran, Jr. . |
| 4,725,694 | 2/1988 | Auer et al. . |
| 4,754,268 | 6/1988 | Mori . |
| 4,755,928 | 7/1988 | Johnson et al. . |
| 4,916,441 | 4/1990 | Gombrich . |
| 4,978,949 | 12/1990 | Herron et al. . |
| 4,994,795 | 2/1991 | MacKenzie . |
| 5,030,128 | 7/1991 | Herron et al. . |
| 5,065,321 | 11/1991 | Bezos et al. . |
| 5,077,547 | 12/1991 | Burgmann . |
| 5,128,981 | 7/1992 | Tsukamoto et al. . |
| 5,146,566 | 9/1992 | Hollis, Jr. et al. . |
| 5,157,247 | 10/1992 | Takahira . |
| 5,187,352 | 2/1993 | Blair et al. . |
| 5,247,285 | 9/1993 | Yokota et al. . |
| 5,249,218 | 9/1993 | Sainton . |
| 5,267,181 | 11/1993 | George . |

(List continued on next page.)

OTHER PUBLICATIONS

Agnew et al., "System for Integrating Lap–Top Computers into Users' Environments," IBM TDB vol. 34, No. 4A, Sep. 1991.
Appino et al., "Personal Computer Environmental Control Via a Proximity Sensor," IBM TDB Vol. 36, No. 8, Aug. 1993.
Cato et al., "Wireless Hardware on Local Area Network," IBM TDB vol. 34, No. 6, Nov. 1991.
Harrison, C., "Wearable Interconnection for Portable Computers," IBM TDB vol. 34, No. 10B, Mar. 1992.
Heins, D., "Universal Wireless Connectivity for Portable Computers," IBM TDB vol. 37, No. 04B, Apr. 1994.

*Primary Examiner*—Tod R. Swann
*Assistant Examiner*—Paul E. Callahan
*Attorney, Agent, or Firm*—Lily Neff; Heslin & Rothenberg PC

[57] ABSTRACT

A docking method for establishing secure wireless connection between computer devices is presented. The technique assumes that at least one of the computer devices comprises a portable device. Further, a docking area or docking port is associated with the other computer device. The docking port is sized to at least partially engageably receive the portable device. Means are provided for automatically establishing wireless connection between the portable device and the second device when the portable device is brought within the docking port (or docking area) of the second device. This automatic establishing of wireless connection includes communicating an address identifier between the portable device and the second device once the portable device is "docked." If desired, an encryption key can also be exchanged with the address identifier to allow for encryption of information communicated between the devices. After docking, the first device can be removed from the docking area (or docking port) without affecting the wireless connection between the first device and the second device.

11 Claims, 7 Drawing Sheets

U.S. PATENT DOCUMENTS

| | | |
|---|---|---|
| 5,274,841 | 12/1993 | Natarajan et al. . |
| 5,321,395 | 6/1994 | Van Santbrink . |
| 5,347,545 | 9/1994 | Ishii et al. . |
| 5,706,031 | 1/1998 | Brendzel et al. ......................... 345/172 |
| 5,710,728 | 1/1998 | Danielson et al. ....................... 364/707 |
| 5,729,220 | 3/1998 | Russell ....................................... 341/22 |
| 5,781,723 | 7/1998 | Yee et al. ................................. 395/186 |
| 5,793,630 | 8/1998 | Theimer et al. ..................... 364/40.01 |
| 5,812,930 | 9/1998 | Zavrel ....................................... 455/5.1 |
| 5,825,617 | 10/1998 | Kochis et al. ........................... 361/686 |
| 5,845,621 | 12/1998 | Junod et al. ............................. 345/158 |

5,923,757

DOCKING METHOD FOR ESTABLISHING SECURE WIRELESS CONNECTION BETWEEN COMPUTER DEVICES USING A DOCKET PORT

CROSS-REFERENCE TO RELATED APPLICATION

This application comprises a continuation-in-part of prior filed pending U.S. patent application Ser. No. 08/296,219 filed Aug. 25, 1994, entitled "Data Mouse," which is hereby incorporated herein in its entirety.

This application is being filed on the same day as related applications, Ser. Nos. 08/808,819, 08/840,683, and 08/848,665.

TECHNICAL FIELD

The present invention relates in general to wireless data communication between different computer devices, and in particular, to a docking system and method for automatically establishing secure wireless connection between a portable computing device and another intelligent device.

BACKGROUND ART

In the existing art, there are a variety of devices and networks to move data from one data processing system (e.g., a first personal computer system) to another data processing system (e.g., a second personal computer system). These techniques include diskettes (e.g., magnetic and optical), local area hardwired networks, various wireless transmission networks, and semiconductor memory cards.

Of particular relevance to the present invention is the use of a wireless methodology for transferring data from a portable data storage device to a data processing system. For example, in the above-incorporated U.S. patent application entitled "Data Mouse," a portable, hand-held device for transferring data to and from a data processing system via a graphical user interface is presented. A wireless communication link provides two-way communication between the computer and the hand-held data storage unit. The computer's graphical user interface is expanded to provide an icon representing a process that transfers data to or from the hand-held data storage unit in response to a pointer position controlled by the hand-held data storage unit. Data compression and/or encryption may be executed by the computer in response to another icon, or a pop-up menu, controlled by the hand-held unit prior to data transfer and storage in the unit.

A potential problem with use of such wireless communication methodology occurs where the data mouse is employed in relatively close proximity to a plurality of intelligent devices, any one of which the mouse may communicate with via wireless modality. In such an environment, there is a possibility for unauthorized interception of interdevice information being transmitted, as well as transfer of data information to an unintended device. Thus, in an environment with a dense assemblage of devices, any one of which can communicate with the data mouse or other portable device within range of the wireless communications modality, a method is needed to specify which intelligent device is to communicate with which portable device and conversely, which portable device is to receive requests and/or information issued by a member of the assemblage of devices.

Inter-device security and communications selectivity in configurations of devices which are wired together has been solved many times in the art. In addition, a variety of similar methods exist for a multiplicity of devices in a wireless static configuration. Typically, in such an environment a user must explicitly specify the device address (for a Local Area Network (LAN), the device address is fixed and implicit in the firmware of the LAN card). Communications in a wired configuration of computers is reasonably secure from casual interception and easily routed. In a wireless configuration of devices, specific device addresses must be assigned. Depending on whether there is a need for security, the information carried on the wireless medium may be encrypted. The user must explicitly enter the encryption key into each device. This requirement of entering the encryption key information and the communications address is user unfriendly and time consuming; and requires increased expense for an entry method, such as buttons, switches, etc., which increases the cost of the portable device.

Thus, there exists a need in the art for a technique which is user friendly and inexpensive to implement for readily establishing a wireless data connection between a portable device and a selected one of a plurality of intelligent devices.

DISCLOSURE OF INVENTION

Briefly summarized, the invention comprises in one aspect a docking system for establishing secure wireless connection between a first device and a second device, the first device comprising a portable device. The docking system includes a first wireless communication means comprising part of the first device and a second wireless communication means comprising part of the second device. Together, the first and second wireless communication means provide for wireless communication between the first device and the second device. The docking system further comprises means for automatically establishing secure wireless connection between the first device and the second device when the first device is brought within a predefined docking area of the second device. This means for automatically establishing secure wireless connection between the first device and second device includes means for automatically exchanging an address identifier between the first and second devices when the first device is brought within with the predefined docking area of the second device. With the exchange of the address identifier, the portable device can be removed from the docking area without terminating the wireless connection between the first device and the second device.

In another aspect, the invention comprises a docking system for establishing wireless connection between a first device and a second device, the first device again comprising a portable device. In this system, a docking port is associated with the second device. The docking port, which is sized to at least partially engageably receive the first device, is in communication with the second device. A first communication means comprises part of the first device and a second communication means comprises part of the second device. These communication means provide for wireless communication between the first device and the second device. A means for automatically establishing wireless connection between the first device and the second device is also provided which includes means for automatically communicating an address identifier between the first device and the second device when the first device is brought within the docking port. After removal of the first device from the docking port, the first and second devices maintain the wireless connection using the address identifier for communication of information therebetween.

In a further aspect, a method for establishing wireless connection between a first device and a second device is provided. Again, at least the first device comprises a portable device. The second device is further assumed to have a docking area defined in association therewith. The method includes: docking the first device within the docking area; and automatically establishing wireless connection between the first device and the second device in response to docking of the first device within the docking area. This automatic establishing of wireless connection includes automatically communicating an address identifier between the first device and the second device when the first device is docked within the docking area. After removal of the first device from the docking area, the first device and the second device maintain their wireless connection using the communicated address identifier for the communication of information therebetween.

To restate, presented herein is a docking system and method for automatically establishing secure wireless communication between a portable device and a selected intelligent device of a plurality of intelligent devices. A significant goal of the approach presented is ease of use. Specifically, this invention allows establishment of wireless data communications between devices in a manner that is user friendly and inexpensive to implement. An address identifier, and possibly an encryption key, is automatically exchanged between a portable device and a selected intelligent device upon docking of the portable device at a predefined docking area associated with the selected intelligent device. Through the use of limited range wireless communications, this information can be exchanged without also revealing the information to other intelligent devices not in sufficiently close proximity. In maximally secure situations, docking can be via a temporary wired connection for the exchange of the identifier address and encryption key.

The docking approach presented can be applied to various portable devices, including a data mouse and personal digital assistants. Again, the disclosed solution to establishing wireless connection largely relieves the user of any key entry requirements, as well as relieving the user of a need to assign addresses. In addition, by suitably setting up the possible address configurations, the probability of errant communications between a portable device and the plurality of intelligent devices in proximity thereto can be rendered negligible.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

BEST MODE FOR CARRYING OUT THE INVENTION

Generally stated, the present invention comprises a convenient technique for ensuring secure wireless communications between a portable device and a selected device of a plurality of intelligent devices in a dense computing environment. The selected intelligent device could be a stationary device or a mobile computing device. Also, communication does not necessarily need to occur in a one-to-one relationship. A central concept of the present invention is the idea of initially "docking" one computing device (for example, the portable device) with another computing device to which wireless communication is desired. During docking, identifying information including an address identifier and, if desired, an encryption key, is exchanged. Preferably, this exchange occurs automatically once the portable device is docked with the selected intelligent device. By use of limited range wireless communications, encryption and address information can be readily exchanged between the two devices using existing technology, without also revealing this information to other devices (not in sufficiently close proximity).

Maximum security can be obtained by requiring that docking be via temporary wired connection such as connector and plug, or some other hard connection, e.g., a shielded optical connection. Note that docking in accordance with the present invention is a temporary condition. The portable device is only docked a sufficient time interval to allow the transfer of identifying information between the portable device and the computing system so that only that computing system will recognize communication signals from the portable device after the device is removed from the docking port.

With suitable design of the docking structure and communication exchange, no additional effort on the part of the user is required beyond bringing the mobile computing device to within the docking proximity of the other mobile or stationary computing device to which communication is desired. Various mechanisms can be used to accomplish the exchange of information. For example, use of a suitable reed relay and magnetic configuration is possible so that any two devices can detect proximity to each other. Alternatively, low intensity magnetic field induction (coil-to-coil) could be employed.

In the detailed embodiments presented below, the portable device is assumed to comprise a data mouse such as described in the above-incorporated application. However, those skilled in the art should recognize that the concepts presented herein are equally applicable to other types of portable data storage or computing devices. For example, the concepts could apply to docking of a personal digital assistant (PDA), such as the Newton PDA, marketed by Apple Corporation or the Simon PDA marketed by International Business Machines Corporation.

Figure 1:
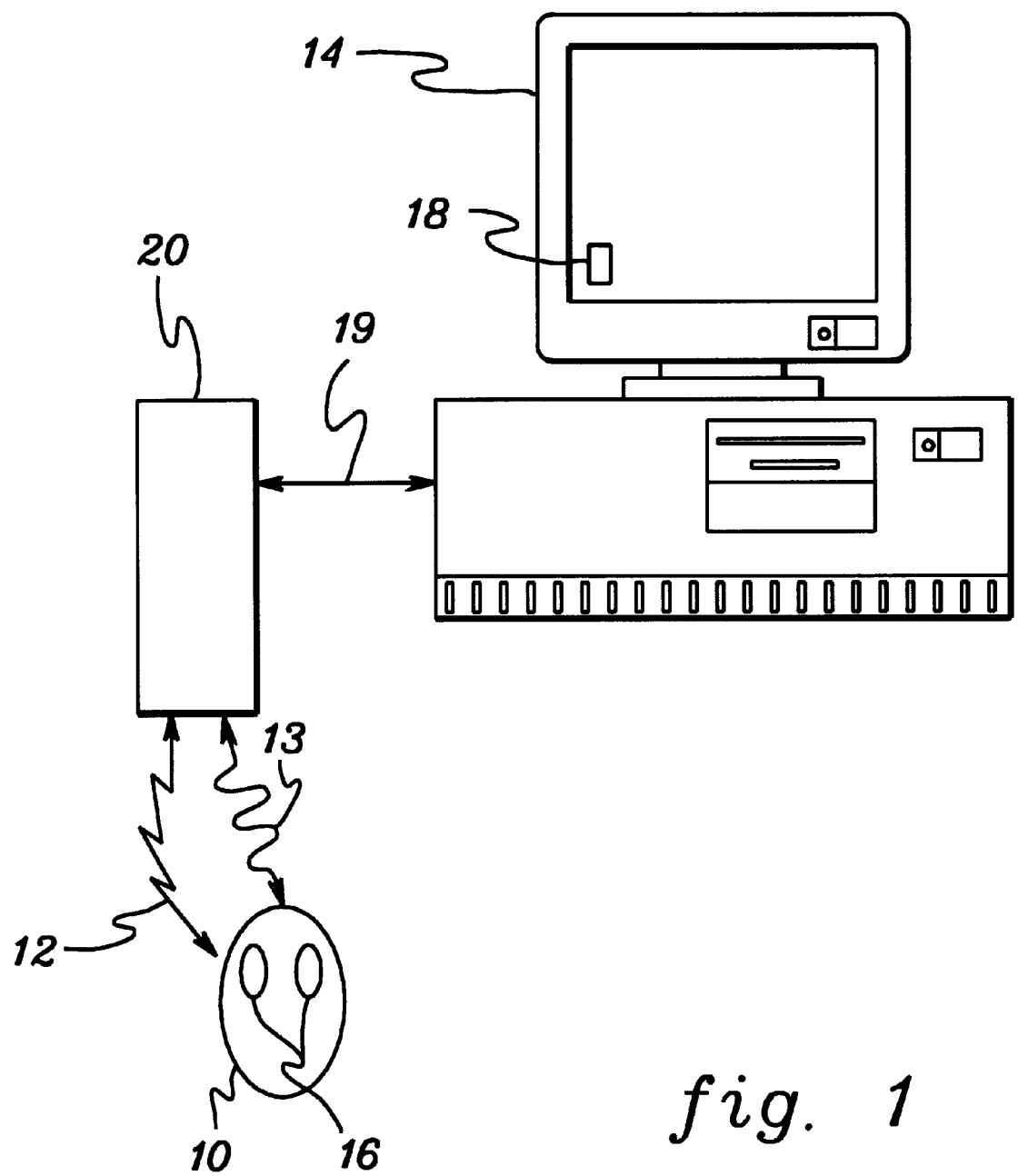
FIG. 1 is a schematic of one embodiment of a portable data device wirelessly linked to a computer system for transfer of data therebetween.

FIG. 1 depicts a portable data storage device 10 wirelessly coupled, e.g., using low power electromagnetic waves 12, to a computer system 14. System 14 is equipped with graphical user interface software, such as that supported by the IBM OS/2 operating system. Use of electromagnetic waves 14 allows greater freedom of placement of device 10 compared with a hardwired connection of the devices. Other wireless communication techniques could also be employed. For example, a wireless optical communication link 13 may be used if desired.

A standard mouse configuration is shown with two "clicker" buttons 16 and a mouse ball assembly (not shown). Additional buttons can be supported if necessary, as can additional controls. Computer system 14 has a display screen 18 and additional hardware 20 to communicate with portable device 10. In one embodiment, hardware 18 is connected via serial cable 19 to computer 14. Thus, handheld device 10 is, insofar as being a pointing device, similar in operation to a standard serial mouse. For further structural and operational details of portable device 10 and its communication with computer system 14, reference the above-incorporated, commonly-assigned pending U.S. application Ser. No. 08/296,219.

Figure 2:
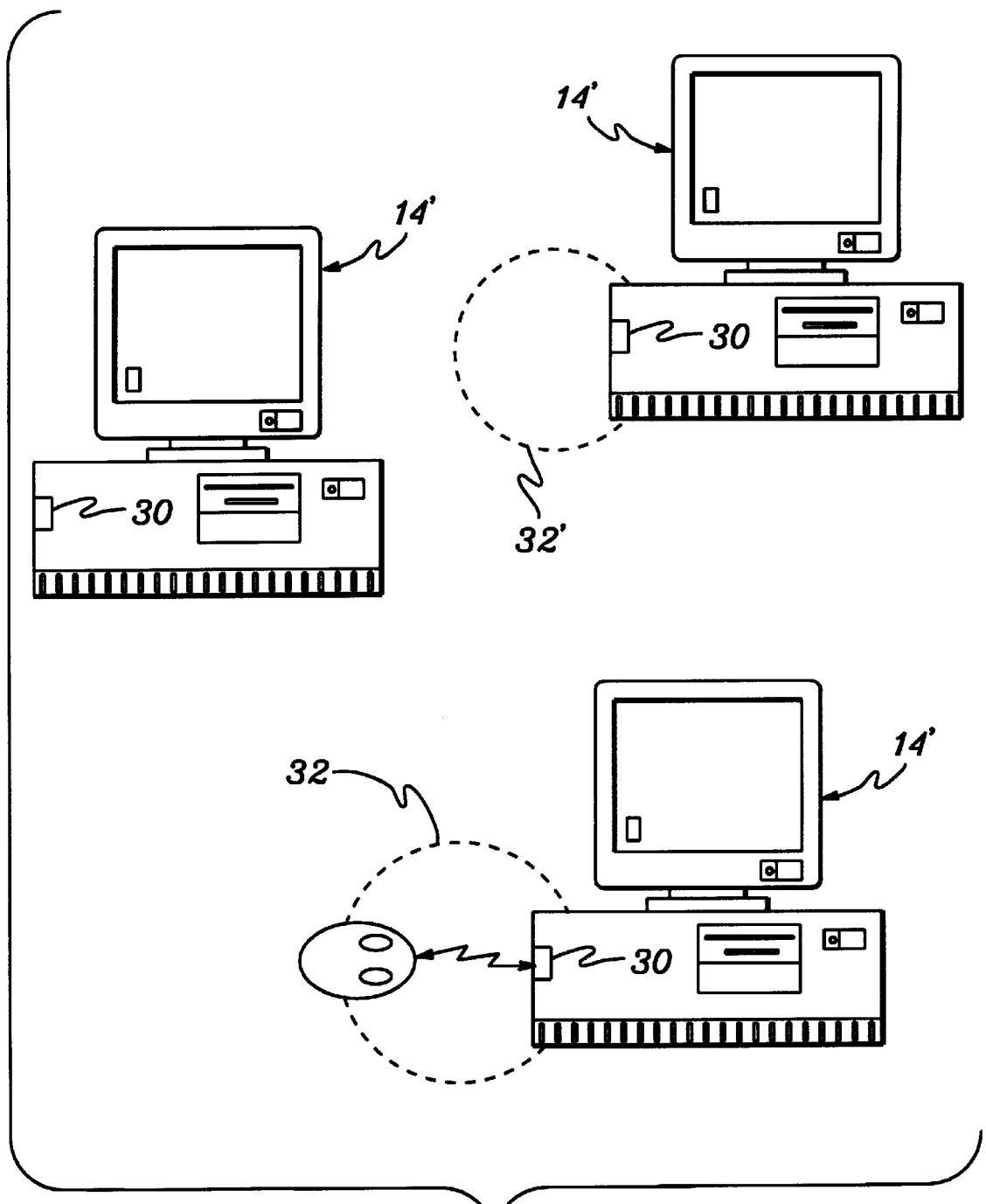
FIG. 2 depicts an environment wherein a plurality of intelligent devices are disposed in close proximity to each other, any one of which the portable data device of FIG. 1 may communicate with via wireless modality.

As explained briefly above, a significant advantage of the present invention is the ability to establish secure wireless connection between a portable device and a selected computing system in a dense computing environment having a plurality of intelligent devices in close proximity to one another. FIG. 2 depicts one embodiment of such an environment wherein multiple intelligent devices, such as computer systems 14', are disposed in close proximity. Each computer system 14' includes docking hardware 30 which allows in accordance with the present invention the automatic establishment of wireless connection between portable device 10 and the computer system when device 10 is brought within a predefined docking area 32, 32'. Areas 32 and 32' are associated with docking hardware 30 of particular systems 14' and the docketing areas 32 and 32' do not overlap. Once identifying information is exchanged, the wireless communications modality of the portable device can be employed anywhere within the dense computing environment without information being intercepted or inadvertently exchanged with an unintended computer system. Note that the exchange of identifying information is preferably automatically activated by proximity of the portable device to the computing system, i.e., disposition of the device within the docking area of the selected computer system. Thus, no explicit user action outside of bringing the portable device into the docking area is needed to initiate the wireless connection through the exchange of identifying information. Again, any portable device, such as a track ball or other pointing device might alternatively be used in place of the data mouse discussed herein.

Figure 3A:
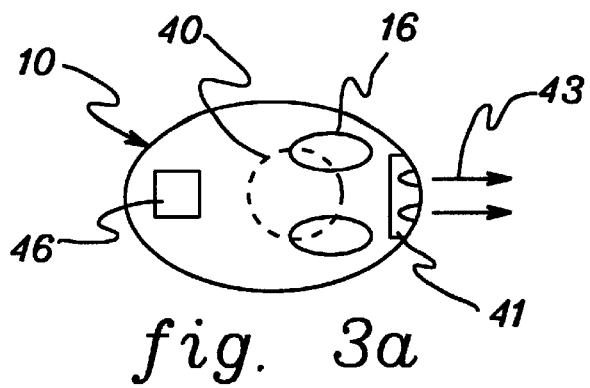
FIGS. 3a and 3b are a plan view and a side elevational view, respectively, of a portable data device for use in accordance with the present invention.
Figure 3B:
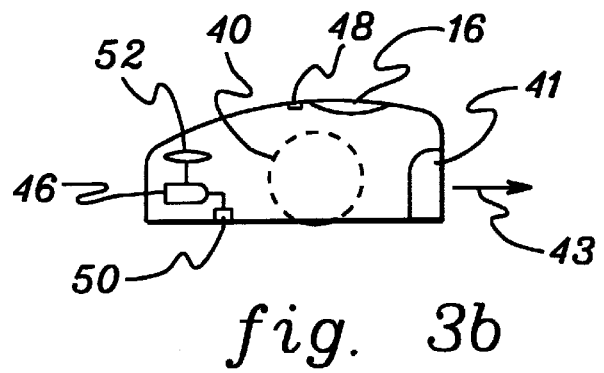

FIGS. 3a and 3b depict one embodiment of a portable device 10 in accordance with the present invention. Device 10 is assumed to comprise a data mouse such as described in the above-incorporated application. This device 10 has a built-in means for controlling the pointer on a graphical user interface equipped computing device (see FIGS. 1 and 2).

Although the present invention is described herein in connection with a mouse, the concepts presented are not limited to that particular portable structure. Preferably, however, at least one of the devices to be wirelessly connected comprises a portable device, which will facilitate "docking" of the devices.

Device 10 contains standard mouse components such as a mouse ball 40 and mouse buttons 16. Not shown in these figures are hardware/software components to implement the data mouse concepts of the incorporated application. For further information on such structure and software reference the incorporated application. In support of the docking concept, an infrared (IR) communications means 41 and supporting electronics 46 are added to wireless mouse 10. These components are discussed further below in connection with FIG. 4. Additionally, there is an optical means such as a light emitting diode 48 to visually signal when docking is successfully accomplished. Other means of indicating successful docking might include tactile sensation means, such as a vibration device 50 and/or an aural indication means, for example, a piezoelectric speaker 52.

Figure 4:
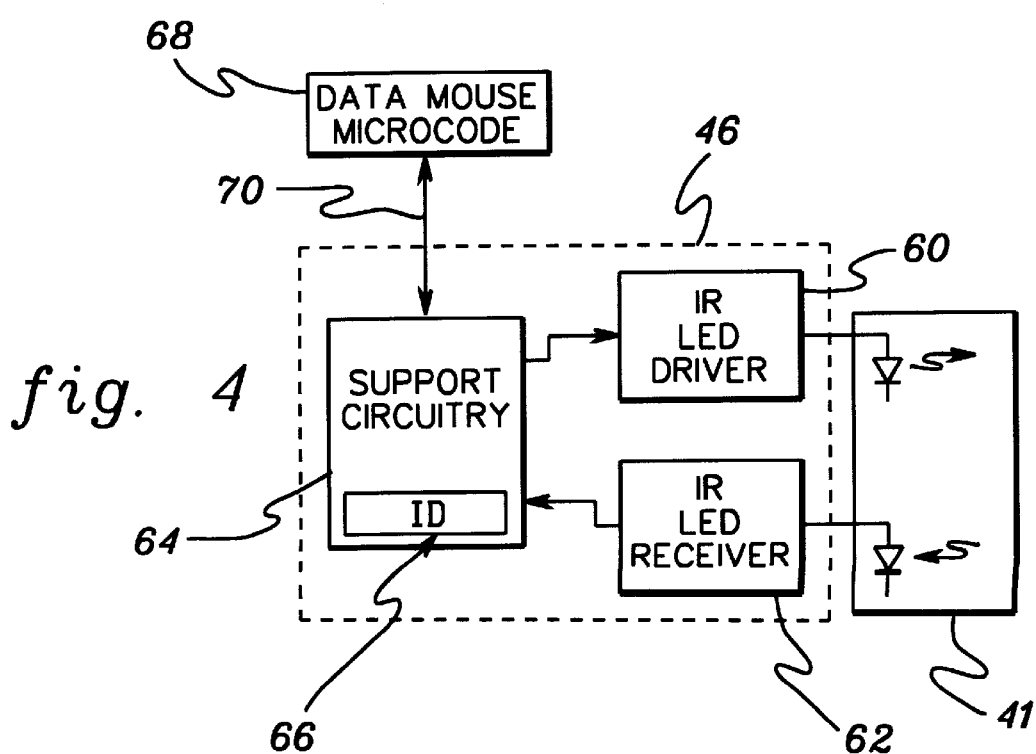
FIG. 4 is a schematic of one embodiment of wireless communication circuitry within the portable data device of FIGS. 3a and 3b.

As shown in FIG. 4, electronics 46 includes an infrared (IR) light emitting diode (LED) driver 60, an IR LED receiver 62 and wireless communication support circuitry 64. Support circuitry 64 incorporates the lowest hardware level of protocol for the communications. One example would be a universal asynchronous receiver/transmitter (UART) for each LED driver or receiver. Note that in some cases, this circuitry is, or can be incorporated into the embedded controller of the data mouse, PDA, or other portable computing devise. Optionally included within circuitry 64 is a unique identifier 66 similar in function to the UID of a token ring local area network (LAN) card. Specifically, each portable device 10 has a different identifier 66 coded therein. For purposes of integration, note that the actual device identifier may exist in code 68 available to supporting electronics 46 via a two-way connection 70. The UID is a universal identifier number which may be unique for each mouse manufactured. However, this is not a requirement since the ID can be assigned by the computing element to which the portable device is docked. If assigned by the computing element, there is a small but finite chance in a dense configuration that more than one portable device would have the same identifier, in which case a redocketing would be necessitated. With encryption, even a simple form of encryption, the chances of casual interception of data would be negligible. Also shown in FIG. 4 is IR communication means 41 disposed at one end of portable device 10.

Figure 5A:
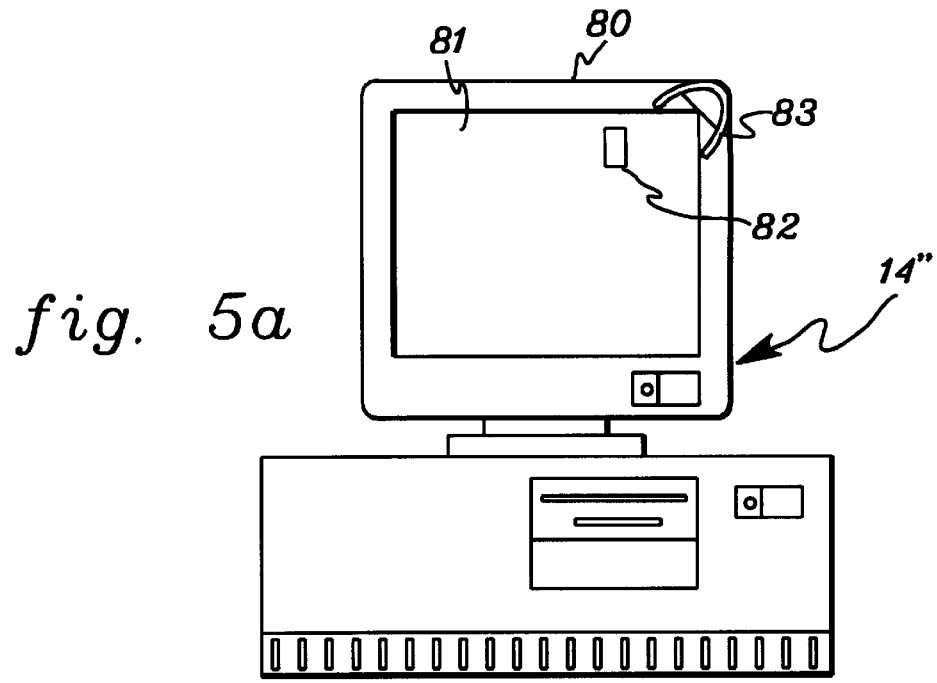
FIGS. 5a and 5b depict a computer display having a docking port in accordance with one embodiment of the present invention.
Figure 5B:
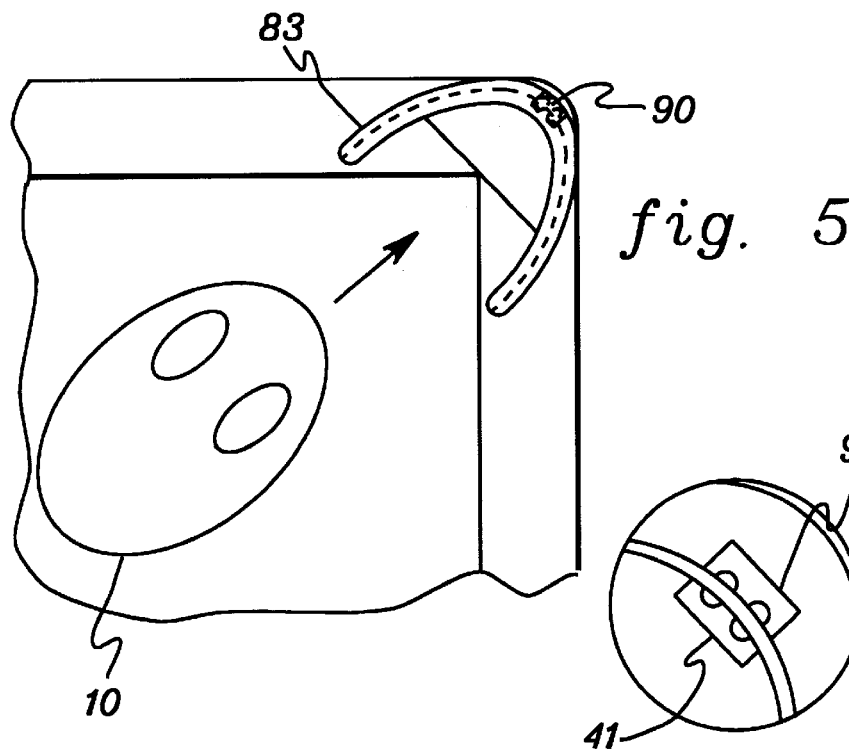
Figure 6:
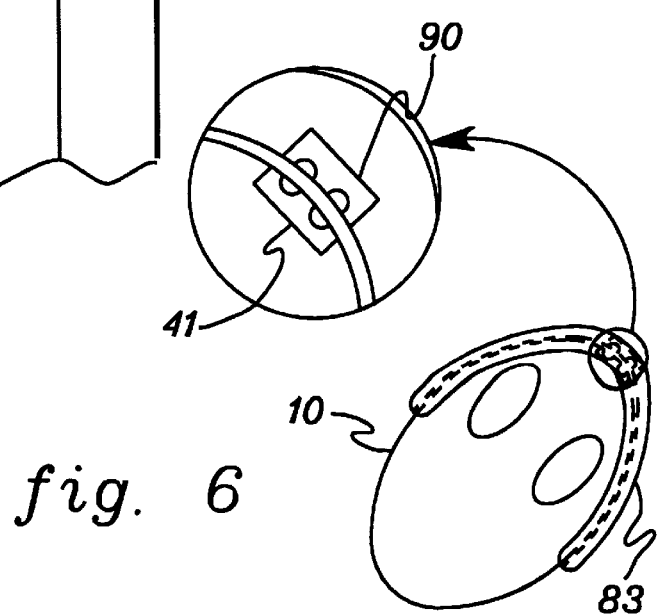
FIG. 6 is an enlarged view of the portable data device of FIGS. 3a and 3b docked within the docking port of FIGS. 5a and 5b.

Another embodiment of the docking concept of the present invention is depicted in FIGS. 5a, 5b and 6. FIG. 5a shows a computer system 14" having a display means 80 with a display screen 81. Computer system 14" might comprise one system of multiple computer systems in a dense computing environment as described above. Clearly, however, the present invention can also be used apart from a dense computing environment to initiate wireless connection between any two devices equipped with corresponding wireless communication means. In accordance with the invention, display means 80 includes a docking port 83, which is shown in greater detail in FIGS. 5b and 6. In this embodiment, docking port 83 comprises a U-shaped structure sized to engageably accommodate the device 10 at least partially therein. Computer screen icon 82 might be employed to show the current status of docking, i.e., whether there is currently a portable device docked and/or active for communicating with the computer system. Further information shown by icon 82 could comprise information described in the above-incorporated application Ser. No. 08/296,219.

Icon 82 could also provide additional security during the docking process. For example, a simple key could be required from the user in order to upload information from the mouse; or a key can be provided to the mouse to further secure information transferred to the mouse as described in the above-incorporated application. Extended icon 82 information might include time of docking and mouse ID in order that a security trail be available.

An advantage of having docking port 83 physically attached to display means 80 is that the display means is typically associated with a single computing device, i.e., the device to which communication is desired. If this is not true, then the docking port could be attached to the computing device itself, or to any other place which may be convenient and which would indicate to a user an association between the docking port and a desired computing element. In this regard, reference the discussion below regarding FIG. 10.

As shown in the enlarged view of FIG. 6, contained within docking port 83 is an IR communication means 90 which communicates with IR communication means 41 of the portable device when the portable device is physically engaged within docking port 83. For example, the optical paths match and/or the receptor frequencies are compatible for communication between the portable device and the computer system through the communication means of the docking port. The docking port is assumed to be in communication with computer system 14".

Compared with the handheld data storage device described in the above-incorporated application, a portable device 10 in accordance with this invention would have several additional characteristics. Software might be included to encrypt the serial data stream to the computer system and to decrypt the serial data stream from the computer system. Technically, decryption software is not required provided the encryption key is downloaded during docking of the portable device to the computer system to receive the data carried by the portable device. That is, the portable device can keep the encrypted data in encrypted form and allow the target computer system to which the data is uploaded to decrypt the data. However, if a mobile computing device is used rather than a portable data mouse, the mobile computing device may require decryption of data in order to make use of that data. An encryption method applied for enhancing security of the wireless communications modality is intended only to thwart casual monitoring. Thus, a simple fast method such as XOR'ing the data stream with the passed encryption key is acceptable.

Preferably, the data mouse or other mobile computing device provides user feedback that docking is successful via an aural indication, a visual indication, a tactile indication, any combination thereof, or any other modality which impinges on the consciousness of the user. The protocol used for both exchange of information during docking and during other times requiring communications would preferably be the same.

One skilled in the art will understand that the computer system would contain the following elements in addition to those elements required for support of the handheld data storage unit described in the above-incorporated application. First, docking hardware suitable to interface to the portable device hardware or other mobile computing device making use of the docking port. Suitable software and/or firmware, to support the docking function, i.e., encryption/decryption (if done in software/firmware) and exchange of keys and device addresses. Also, preferably some sort of visual "target" indication for a user to assist in locating the docking port. Obviously, this depends upon the position of the docking port and the configuration employed, i.e., whether a predefined docking area defined in close proximity to the computing system is employed or a physical docking port structure designed to engageably receive at least a portion of the portable device is used.

Figure 7:
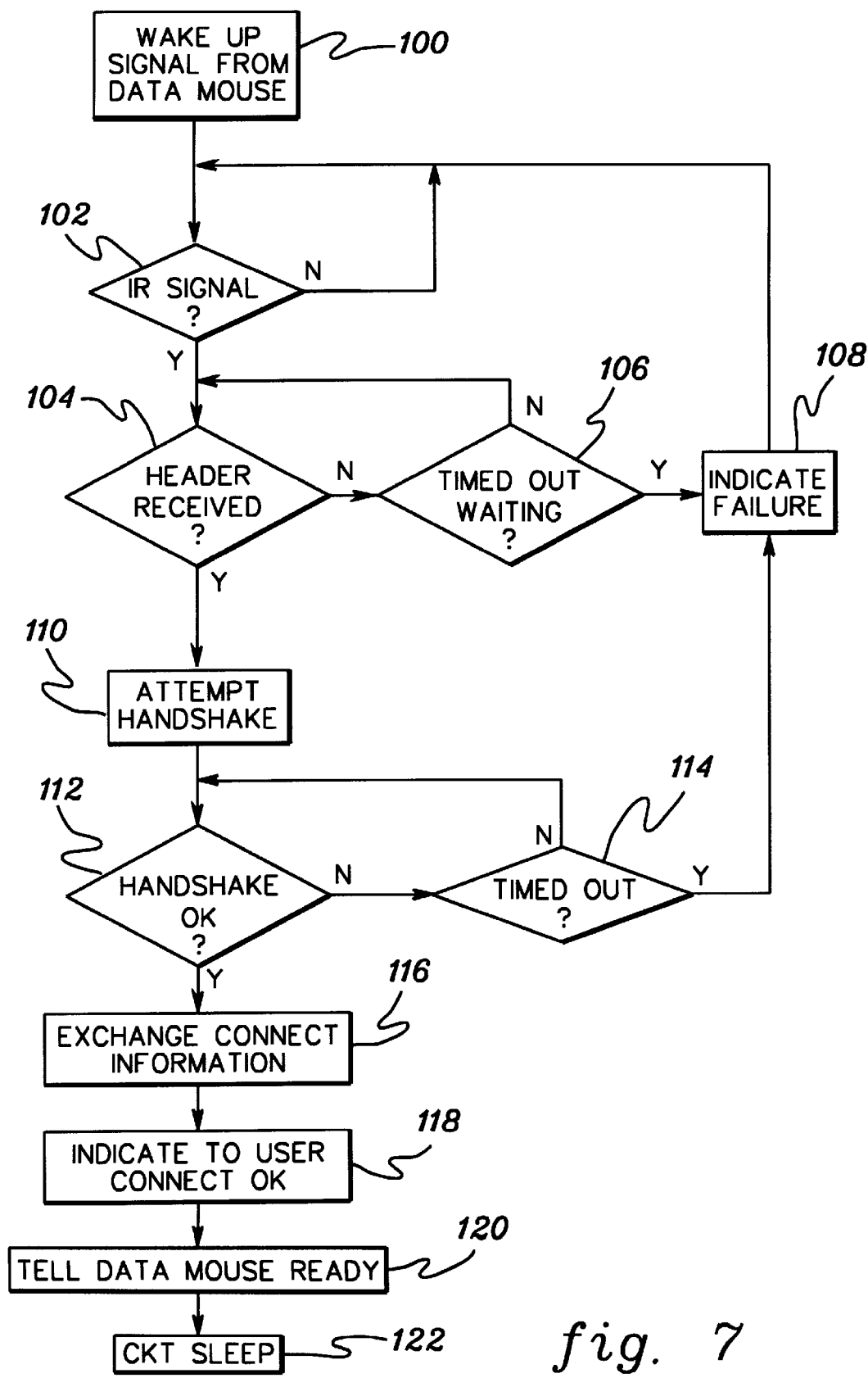
FIG. 7 is a flowchart of one embodiment for establishing communication connection between a portable device and another device in accordance with the present invention.

FIG. 7 depicts one embodiment of a system connection flowchart in accordance with the present invention. Connection processing begins with receipt of a wake up signal from a portable device (100) brought within the docking area or port. Processing then determines whether an infrared signal is detected (102) and if yes, then whether an appropriate identification header is received on that signal (104). Processing holds for a predefined time interval (106) waiting for receipt of the header. If this information is not received within that interval, then a user acknowledgement (108) is provided to signal docking failure and processing returns to polling for receipt of an infrared signal (102). As an option, a time out decision block (not shown) could be added to place the docking circuitry into sleep mode (122) if no infrared signal is received within a predetermined time interval.

Once the header is received, the computer system attempts to establish communication by initiating a handshake (110), and then determines whether the handshake is OK (112). Again, the computer system is instructed to wait a predefined time interval (114) and if the handshake is not established as valid within that interval, then the system signals docking failure to the user (108). Once handshake is established, then identification information is exchanged to establish the connection (116). This information might include a device number for the transmit unit header, an encryption key, if desired, and frequency or other information for wireless communications, for example, a skip algorithm, i.e., information on frequency hopping or spread spectrum use. Once the identification information is exchanged, the user is signaled that the docking connection is accepted (118) and the portable device is acknowledged as activated for wireless communication with the computer system (120). The portable device is removed from the docking area or port and the docking circuitry goes into a sleep mode (122) until receipt of a next wake up signal (100).

Figure 8:
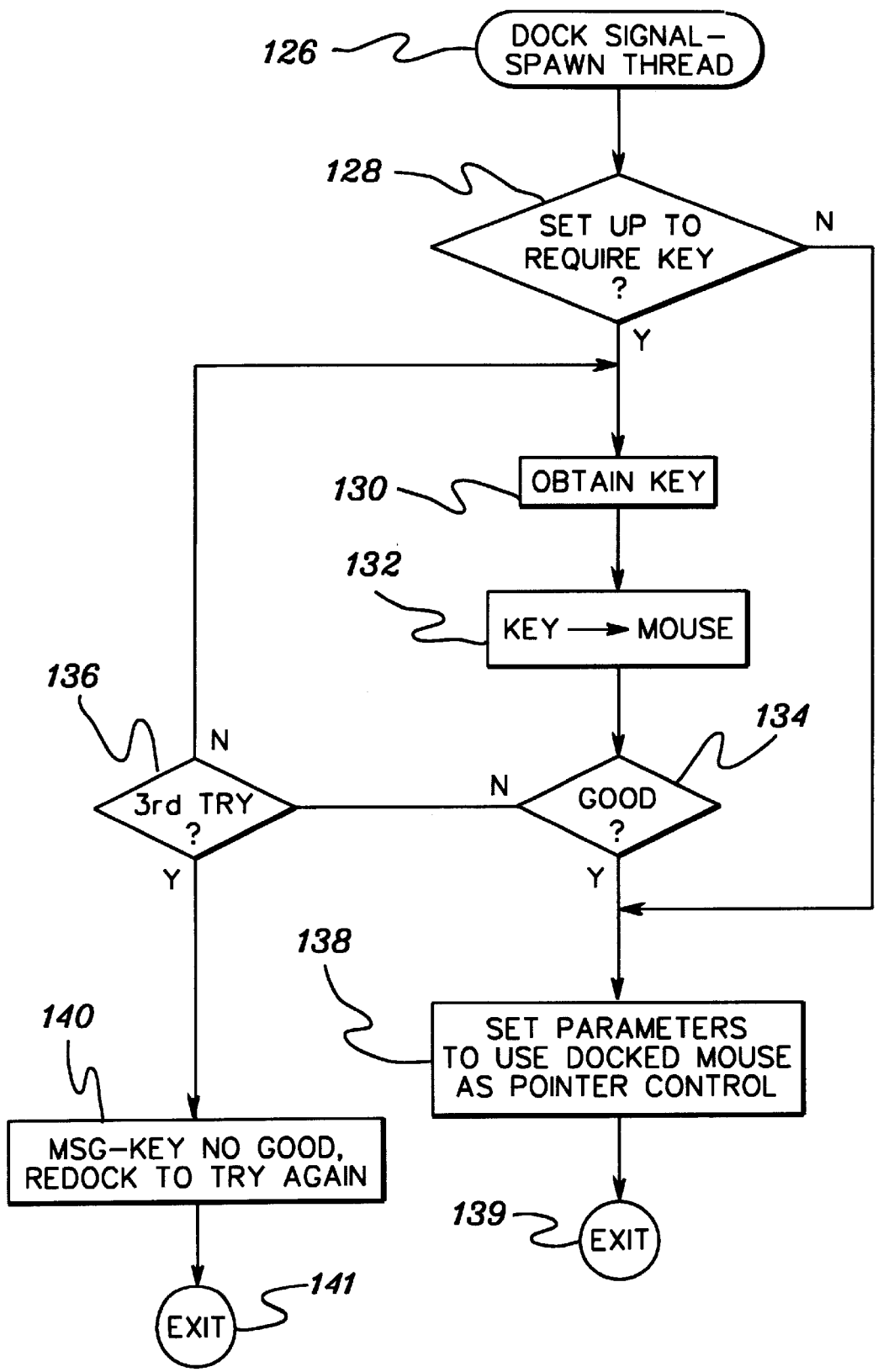
FIG. 8 is a flowchart of one embodiment for establishing encryption on the communication connection between the portable data device and the intelligent device to which the portable device is docked.

FIG. 8 depicts one embodiment for encryption key exchange with docking of the portable device. Initially, a dock signal process start (126) is received. A process start is often referred to in the art as a spawn thread. Spawning a thread is one way a process starts in certain systems, such as IBM's OS/2 operating system. Process start is followed by inquiry into whether the portable device is set up to require an encryption key (128). If yes, the encryption key is obtained, e.g. from the user, (130) and the key is transferred to the portable device (132). In a preferred environment, the key obtained from the user (130) is randomly generated for each docking. By generating the key, the computer system increases ease of use of the system. Note that the generate keys resulting in transmission of plain text would be excluded, plain text comprising text that is not encrypted. Processing then determines whether the key exchange is valid (134). This process is repeated a predetermined number of times, for example, three times (136) or until a valid key exchange is obtained. If no key is required, then processing jumps from inquiring whether a set up key is required (128) to setting the parameters to use the docked portable device as a pointer control to the computer system (138). Thereafter, the computer system exists docking processing. In this embodiment, after three unsuccessful attempts to exchange encryption keys (136), the user is signalled to redock the portable device to reinitiate the docking procedure (140). Processing is then terminated (141) pending redocking.

Figure 9A:
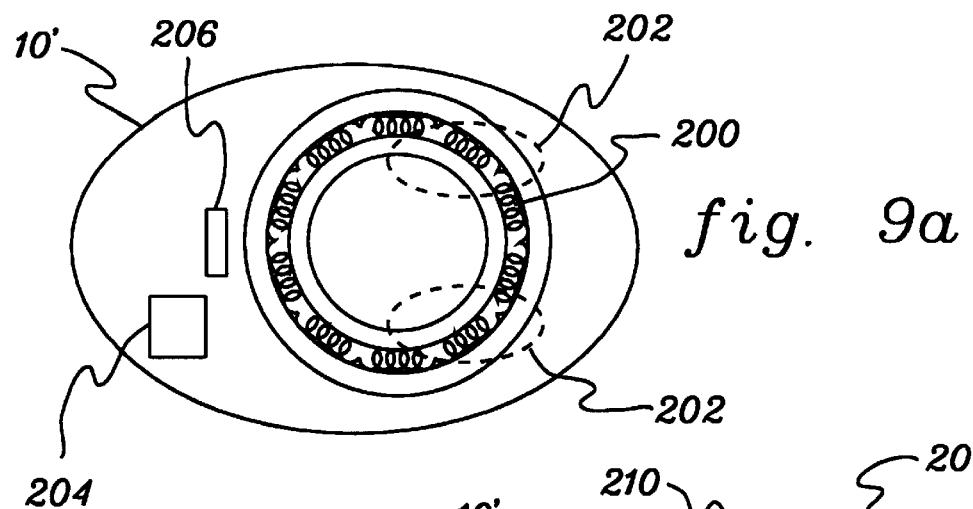
FIGS. 9a and 9b are a plan and elevational view, respectively, of an alternate embodiment of a portable data device for use in accordance with the present invention.
Figure 9B:
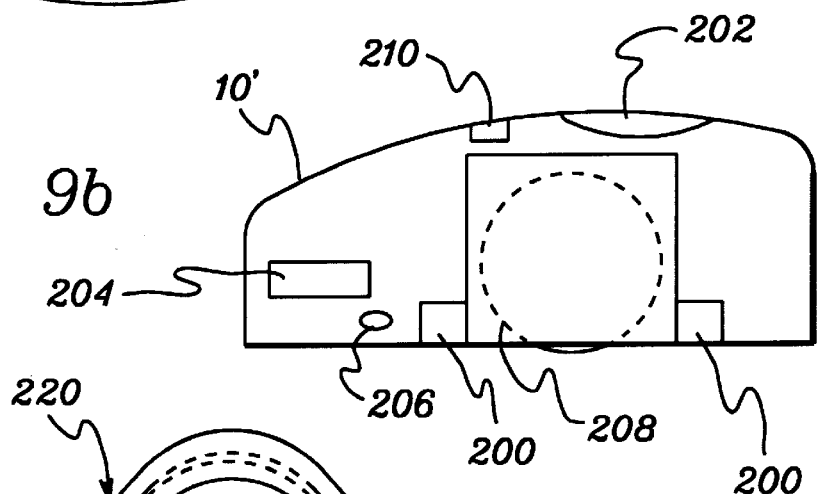

FIGS. 9a and 9b depict an alternate embodiment of portable device 10' wherein an electromagnetic coil 200 is employed, for example, for radio wave communication with a computer system. The components of portable device 10' are the same or analogous to those discussed above in connection with device 10 of FIGS. 3a and 3b. Briefly explained, device 10' includes toroidal coil 200 for electromagnetic coupling, mouse buttons 202, electronic circuitry 204 supporting the docking function, reed relay 206 (contact portion), a mouse ball 208, and a light emitting diode 210 visible to a user of portable device 10'.

Figure 10:
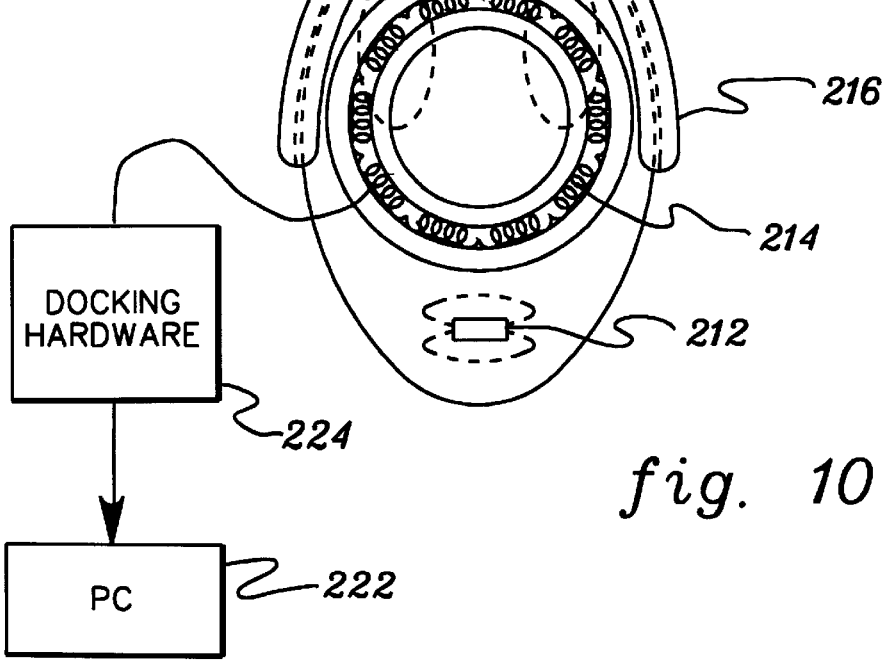
FIG. 10 is a schematic of an alternate docking approach for establishing communication connection between the portable data device and a computer system in accordance with the present invention.

FIG. 10 depicts an alternate docking embodiment wherein the portable device 10' is physically engaged within a docking port 220 separate from an associated computer system 222. Docking port 210 is electrically coupled via docking hardware 224 to computer system 222. If desired, docking hardware 224 can be integrated within the computer system 222. One of ordinary skill in the art can implement docking hardware 224 based upon the concepts presented herein.

In this embodiment, docking is accomplished by bringing mouse 10' in close proximity to docking port 220 so that magnet 212 at the docking port closes reed relay 206. The closure of relay 206 activates docking electronics 204 to commence communications using magnetic coupling via toroidal coil 200 in data mouse 10' and toroidal coil 214 at docking port 220. A mechanical stop 216 aids the user in aligning the data mouse with the coil and magnet of the docking port.

Note that although this embodiment only depicts a light emitting diode 210 for indicating docking status, the other methods described above could also be employed. Fundamentally, the docking operation is similar to that described above in connection with the optical coupling embodiment. In this alternate embodiment, however, the means of detecting a connection, i.e., the reed relay, and the means of communicating, i.e., magnetic coupling of coils, are different. However, the balance of the logical connection of the data mouse to the computer system is the same. This alternate embodiment has the advantage of potentially consuming less power and having greater tolerance for misalignment.

To restate, presented herein is a docking system and method for automatically establishing secure wireless communication between a portable device and a selected intelligent device of a plurality of intelligent devices. A significant goal of the approach presented is ease of use. Specifically, this invention allows establishment of wireless data communications between devices in a manner that is user friendly and inexpensive to implement. An address identifier, and possibly an encryption key, is automatically exchanged between a portable device and a selected intelligent device upon docking of the portable device at a predefined docking area associated with the selected intelligent device. Through the use of limited range wireless communications, this information can be exchanged without also revealing the information to other intelligent devices not in sufficiently close proximity. In maximally secure situations, docking can be via a temporary wired connection for the exchange of the identifier address and encryption key.

The docking approach presented can be applied to various portable devices, including a data mouse and personal digital assistants. Again, the disclosed solution to establishing wireless connection largely relieves the user of any key entry requirements, as well as relieving the user of a need to assign addresses. In addition, by suitably setting up the possible address configurations, the probability of errant communications between a portable device and the plurality of intelligent devices in proximity thereto can be rendered negligible.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A method for establishing wireless data communications having a computer docking system comprising the steps of:

providing a first portable device having a first communications means;

providing a second communication component having a docking port, said docking port being able to at least partially engageably receive said first device;

docking said first device within said docking port; and automatically establishing wireless connection between said first device and said second component in response to said docking step while said docking port and said device are partially engaged; and maintaining said wireless connection for communication of information after said first device is removed.

2. The docking method of claim 1 further comprising providing means for communicating an address identifier between said first device and said second component once said first device is engaged within said docking port, wherein after removal of said first device from said docking port, said first device and said second component maintain said wireless connection for communication of information there between using said exchanged address identifier.

3. The docking method of claim 2, wherein said second component comprises a computer system and said means for automatically exchanging said address identifier includes means for automatically initiating said address identifier exchange when said portable device physically engages said docking port.

4. The docking method of claim 3, wherein said docking system is a component of a display means of said computer system.

5. The docking method of claim 4, wherein said docking port comprises a U-shaped port disposed adjacent to a display means of said computer system.

6. The docking method of claim 1, further comprising the step of signalling a user once secure wireless connection has been established between the first device and the second component.

7. The docking method of claim 1, further comprising the step of providing a first encryption means associated with said first device and a second encryption means associated with said second component, said first and second encryption means allowing for encryption of information to be transferred between said first device and said second component over secure wireless connection, and wherein said system further comprises means for exchanging an encryption key between said first device and said second component when said first device is brought within any predefined docking area of said second component.

8. The docking method of claim 1, wherein said second component comprises a computer system, and further comprising the step of physically coupling said docking port to said computer system.

9. The docking method of claim 8, wherein said docking port comprises a U-shaped structure physically disposed on a display means of said computer system, and wherein said first device comprises a data mouse.

10. The docking method of claim 1, wherein said first communication means and said second communication means each comprise electromagnetic communication means.

11. The docking method of claim 1, wherein said first communication means and said second communication means each comprise infrared communication means.

* * * * *

UNITED STATES PATENT AND TRADEMARK OFFICE
CERTIFICATE OF CORRECTION

PATENT NO. : 5,923,757
DATED : July 13, 1999
INVENTOR(S) : Hocker et al.

It is certified that error appears in the above-identified patent and that said Letters Patent is hereby corrected as shown below:

Column 1, line 12, "08/808,819, 08/840,683, and 08/848,665." should be --08/838,819, 08/843,683, 08/843,665.--

Signed and Sealed this

Twenty-ninth Day of August, 2000

Attest:

Q. TODD DICKINSON

*Attesting Officer*          *Director of Patents and Trademarks*